United States Patent [19]

Gueugnon et al.

[11] Patent Number: 4,763,215
[45] Date of Patent: Aug. 9, 1988

[54] DEVICE FOR WRITING HIGH DENSITY DATA ON A MAGNETIC MEDIUM

[75] Inventors: Catherine Gueugnon, Paris; Jacques Desserre, Rambouillet; Pierre Bernstein, Meudon, all of France

[73] Assignee: CII-Honeywell Bull (Societe Anonyme), France

[21] Appl. No.: 28,033

[22] Filed: Mar. 18, 1987

Related U.S. Application Data

[63] Continuation of Ser. No. 542,032, Oct. 14, 1983, abandoned.

[30] Foreign Application Priority Data

Oct. 22, 1982 [FR] France .................. 82 17730

[51] Int. Cl.⁴ .................. G11B 5/23; G11B 5/187
[52] U.S. Cl. .................. 360/119; 360/122; 360/125
[58] Field of Search .............. 360/125, 119, 122, 123, 360/126, 127

[56] References Cited

U.S. PATENT DOCUMENTS

| | | | |
|---|---|---|---|
| 3,313,889 | 4/1967 | Machinski | 360/119 |
| 3,564,558 | 8/1968 | Tolman et al. | 360/119 |
| 3,984,874 | 10/1976 | Mano | 360/119 |
| 4,222,084 | 9/1980 | Nakagawa et al. | 360/119 |
| 4,251,842 | 2/1981 | Iwasaki et al. | 360/134 |
| 4,253,127 | 2/1981 | Kodama et al. | 360/125 |
| 4,277,809 | 7/1981 | Fisher et al. | 360/131 |
| 4,287,544 | 9/1981 | Lazzari | 360/131 |
| 4,380,784 | 4/1983 | Desserre et al. | 360/123 |
| 4,564,877 | 1/1986 | Ezaki et al. | 360/122 X |

FOREIGN PATENT DOCUMENTS

| | | | |
|---|---|---|---|
| 2480014 | 10/1981 | France | 360/122 |
| 0009110 | 1/1978 | Japan | 360/125 |
| 0172525 | 10/1982 | Japan | 360/125 |
| 0210414 | 12/1982 | Japan | 360/125 |
| 0079402 | 5/1984 | Japan | 360/122 |
| 1306848 | 2/1973 | United Kingdom | 360/111 |

OTHER PUBLICATIONS

Dawson et al., Edge Effect Magnetic Recording, Dec. 1966, pp. 776–777.

Primary Examiner—Robert S. Tupper
Assistant Examiner—Andrew L. Sniezek
Attorney, Agent, or Firm—Kerkam, Stowell, Kondracki & Clarke

[57] ABSTRACT

A device and method for writing data on a magnetic medium (SMI) are disclosed for use in connection with a recording layer (CMI1) made from an anisotropic material having the axis of easy magnetization perpendicular to its surface and which moves past at least one magnetic writing transducer (TMI). According to the invention, this device is characterized by the fact that the transducer comprises two adjoining writing poles (PEI1, PEI2) having opposite polarities and supplying simultaneously, in a direction (Oz) parallel to the surface of the layer and perpendicular to the base material's direction of motion, magnetic writing fields (Hy) which are normal to the surface of the layer with opposite polarity. The device is particularly applicable for writing data on a magnetic disc adapted for opto-electronic readout.

12 Claims, 5 Drawing Sheets

DEVICE FOR WRITING HIGH DENSITY DATA ON A MAGNETIC MEDIUM

This is a Continuation, of Application Ser. No. 542,032, filed Oct. 14, 1983 now abandoned.

BACKGROUND OF THE INVENTION

1. Field of the Invention

The present invention relates to data writing (recording) on a magnetic medium. More particularly, it is applicable to the high surface density writing of data on the magnetic disks of magneto-optical storages used mainly in data processing systems.

2. Description of the Prior Art

In data processing systems, the result of the operations performed by a central processor unit (CPU) is either utilized and analyzed immediately by the user or stored for variable periods of time in stores such as mass memories or bulk storages. Magnetic disks are the most frequently employed as the storage element. The data carried by the magnetic disks is stored within circular concentric recording tracks having a radial width of the order of a dozen microns or more and usually covers the major part of the two sides of the disks.

As a rule, a string of magnetic data written on a track of a disk is present in the form of a succession of small magnetic domains called "elementary domains" distributed throughout the length of the track and having magnetic inductions with the same modulus and opposite direction.

Line density is defined as the number of changes in the direction of magnetization per unit length measured in accordance with the circumference of a track, and radial density is the number of tracks per unit length measured in accordance with the diameter of the disk. Surface density is the number of data per unit of surface. In high density stores, one aims at obtaining radial and per unit length densities of the order of, respectively, 5000 tracks per cm and 10,000 changes in the direction of magnetization per cm.

The means by which data can either be written (or recorded) or read on the disks are called transducers. As a rule, one side of a given disk is associated with one or more transducers, with the disk moving past the transducer(s).

In the development of magnetic disk stores, one of the current developments is magneto-optical stores where the data is written on magnetic disks, while the reading is effected by a set of opto-electronic devices. Opto-electronic reads permit one to observe at a given moment and at a given location one side of a disk by means of a polarized light beam and to deliver an electric signal whose voltage or current is dependent upon the value of the data present at that location. This signal is supplied by at least one photoelectric transducer which receives the polarized light from the light whose properties are modified on contact of the disk's side so that, for example, if the beam comes into contact with a magnetic domain of negative magnetization, the photoelectric transducer delivers a signal with a non-zero voltage.

The mode or method of writing (or recording) data on the magnetic disks of magneto-optical storages is such that the magnetization in the elementary domains is perpendicular to the magnetic recording layer of the disk. This type of magnetization permits one to obtain greater longitudinal and radial densities of data and its mode of observation by means of a light beam is easier than the mode of observation of an environment where the magnetization is longitudinal, that is to say, parallel to the surface of the layer. This mode of recording data is called a "perpendicular recording mode". In this case, the magnetic environment constituting the layer is a magnetic anisotropic environment, that is to say, an environment having one or more privileged directions of magnetization (also called "direction of easy magnetization"). In magneto-optical storages, one of the modes for writing data consists in utilizing magnetic transducers usually composed of a magnetic circuit around which a winding is arranged and which contains a gap. The variation of the induction within the gap permits the writing of data present on the medium associated with this transducer.

Thus, it is seen that the device for recording data on the magnetic disks of magneto-optical storages is most frequently formed by associating a magnetic recording layer of the magnetic disk with a magnetic transducer arranged opposite the latter, its gap being spaced a very small distance from the layer which ranges, say, between zero and several tenths of a micron.

In this type of devices for writing data with a very high surface density, magnetic integrated transducers are preferred. A description of such magnetic data carriers and a magnetic integrated transducer is found, for example, in U.S. Pat. No. 4,287,544.

Such magnetic integrated transducers generally comprise two pole pieces made of thin magnetic layers arranged on the same side of the data medium and having a gap in the vicinity thereof. The pole pieces enclose an electric winding formed of thin conducting superimposed layers which are separated from one another by thin insulating layers. The gap of the magnetic integrated transducer is placed such that its length is perpendicular to the direction of motion of the magnetic medium. The transducer moves past the base material at right angles to the plane of the two magnetic layers constituting the pole tips. During this motion, any magnetic domain of a track of the base material opposite which the transducer is placed moves, with time, successively past a first pole tip called the "upstream pole tip" and then past the second pole tip called the "downstream pole tip". Preferably, if their dimension measured parallel to the direction of motion is called "pole tip thickness", the thickness of the downstream pole tip is substantially smaller than that of the upstream pole tip.

The writing of data on the medium is effected by causing the base material to move at a given speed and causing a variable current representing the data to be written to pass through the winding. This current causes the generation of a magnetic flux in the pole tips, the path of which is closed through the magnetic layer of the data medium. Opposite the downstream pole tip the magnetic flux is concentrated because of the thinness thereof. Since the axis of easy magnetization of the layer of data is at right angles to the surface of the magnetic recording layer, the magnetic field opposite the downstream pole tip is canalized, i.e., concentrated, in this direction. Opposite the upstream pole tip, the magnetic field is scattered and has a much smaller intensity than the magnetic field opposite the downstream pole tip. This permits non-saturation of the magnetic layer of data at the upstream pole tip, thereby allowing the downstream pole tip to write data in the best conditions. To sum up, it is obvious that in such prior art devices, for high density writing of data, only the downstream pole tip defines the nature of the data recorded on the base material, that is to say, especially the direction and the modulus of the magnetic induction in each of the domains created thereon. This is also true when the "downstream" and "upstream" pole tips have approximately the same thickness.

Thus, it is apparent that, although there are two pole tips (or, simply, two poles), only one pole tip writes data: in other words, there is only one writing pole, the second pole tip (or second pole) allowing only the flow of the magnetic flux generated by the winding of the transducer.

It is obvious that the two writing poles PEI1, PEI2 form the magnetic circuit of the transducer TWI which contains the gap GI.

Figure 4:
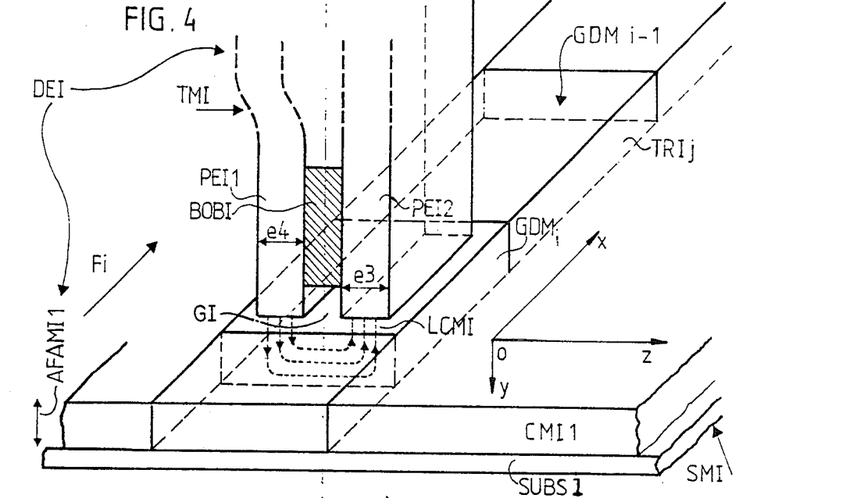
FIG. 4 is a fragmentary perspective view of the device.
Figure 5:
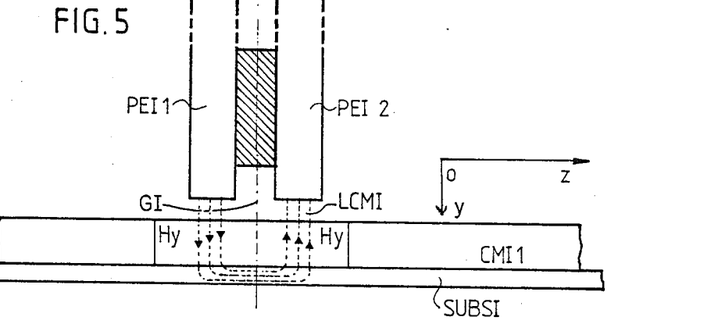
FIG. 5 is a fragmentary cutaway side view taken in a plane normal to the magnetic recording medium and perpendicular to the direction of motion of the data.

In FIGS. 4 and 5, the transducer TMI and tte recording

The type of transducer for high density writing described above permits one to obtain longitudinal densities of the order of 2 to 4,000 changes per cm in the direction of magnetization and radial densities of the order of 4 to 500 tracks per cm. These densities are insufficient for the performances contemplated for magneto-optical storages.

SUMMARY OF THE INVENTION

The present invention enables this drawback to be overcome and relates to a device for writing data on a magnetic medium which is most suitable for recording on a magnetic disk, and which enables radial densities to be obtained of the order of 5,000 tracks per cm and per unit length densities of 10,000 changes in the direction of magnetization per cm. This is obtained by using a magnetic transducer having two writing poles which write simultaneously and radially on the base material, i.e. the magnetic disc, adjoining magnetic domains with equal and opposite magnetizations. The group of these two adjoining magnetic domains with opposite magnetizations is called the "large magnetic domain" and a track is thus composed of a plurality of successive large magnetic domains of variable length and opposite nature. This means that a "large magnetic domain", where the magnetizations in a given direction (for a disc) are successively negative, then positive, is surrounded by two "large magnetic domains", where the magnetizations in the same radial direction are succesively positive and negative.

It is shown that the radial density (and, thereby, the surface density) obtained is the higher, the smaller the dimension of the writing poles measured in the radial direction (the thickness of the poles). Thus, densities can be obtained of the order of magnitude of those indicated above with thicknesses of the order of from one to several microns currently attained in magnetic integrated transducers.

These "large magnetic domains" thus written by the device of the invention have the advantage of being magnetically self-stabilizing. Moreover, the two domains constituting each of these can be read simultaneously by means of a suitable magnetooptical device of the type described in French patent application No. 82.08406 filed by the assignee of the present invention in France on May 14, 1982 and entitled "Opto-Electronic Process of Reading Data Present on a Magnetic Medium and Circuit for Implementing the Same" and corresponding to U.S. Ser. No. 490,127, filed Apr. 29, 1983, now U.S. Pat. No. 4,531,205 . It is shown that this permits improvement of the signal/noise ratio of the device for reading data present on the base material.

According to the invention, the device for writing data on a magnetic medium, formed by associating the recording layer of the base material composed of a magnetic anisotropic material having the axis of easy magnetization at right angles to its surface and at least one magnetic transducer composed of a magnetic circuit associated with an electric winding and comprising a gap, with the base material moving past the transducer, is characterized by the fact that the magnetic circuit of the transducer contains two adjoining writing poles with opposite polarity and which simultaneously supply, in a direction parallel to the surface of the layer and at right angles to the direction of motion of the base material, magnetic writing fields which are normal to the surface layer and are of opposite polarity.

Preferably, the device is characterized by the fact that the two poles are composed of thin layers and form the magnetic circuit by being united at one end in such a way that they are coupled magnetically and by being placed at the other adjoining end of the base material so as to form the gap whose length is parallel to the direction of motion.

BRIEF DESCRIPTION OF THE DRAWINGS

The features and advantages of the invention will become more apparent to one skilled in the art from the following description, reference being had to the accompanying drawings:

FIGS. 1, 2 and 3 show a device for high-density writing as known from the prior art wherein

FIGS. 4 and 5 show the principle of the invention for high-density writing wherein

DESCRIPTION OF THE PREFERRED EMBODIMENTS

Figure 1:
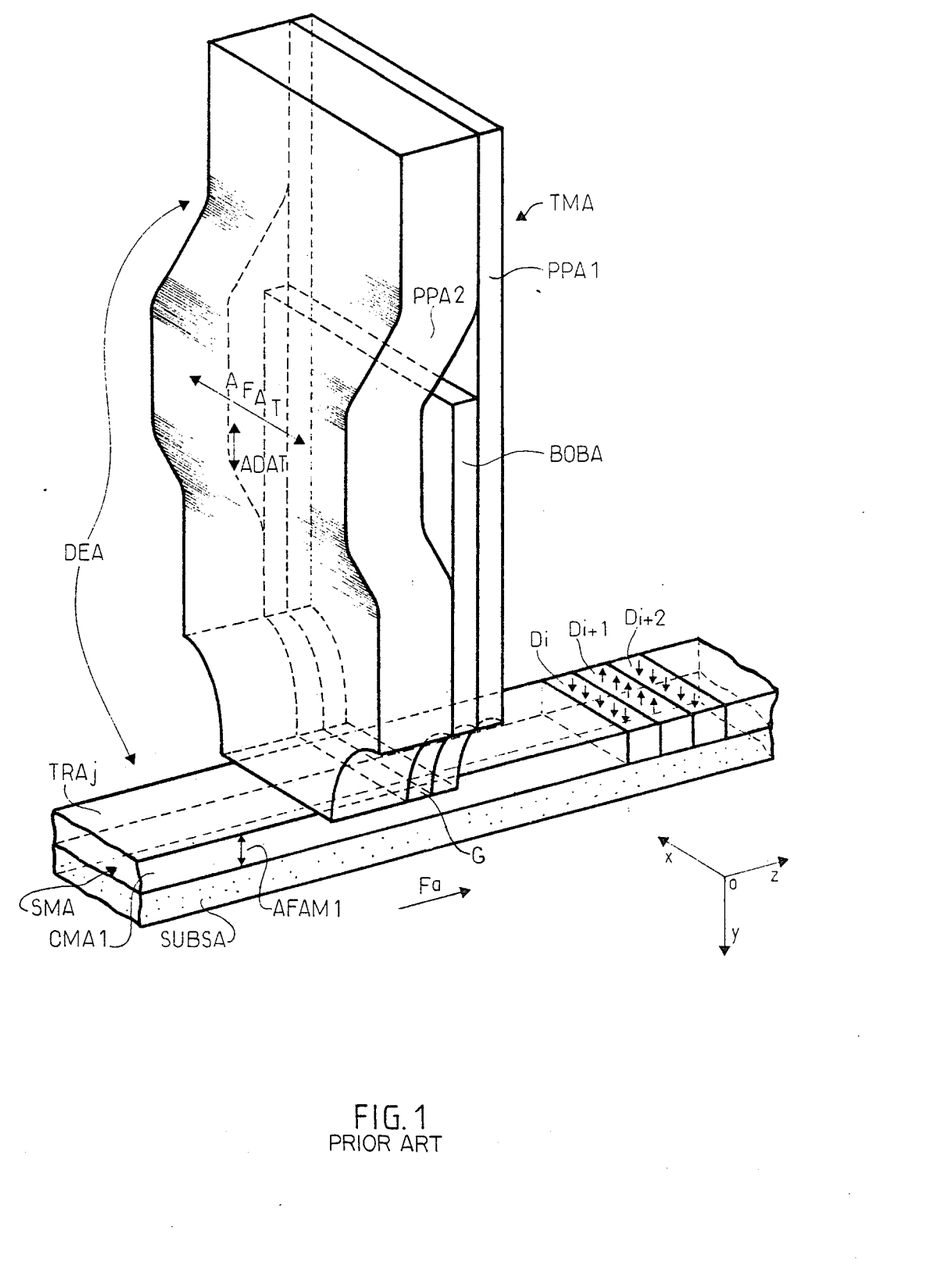
FIG. 1 is a fragmentary perspective view.
Figure 2:
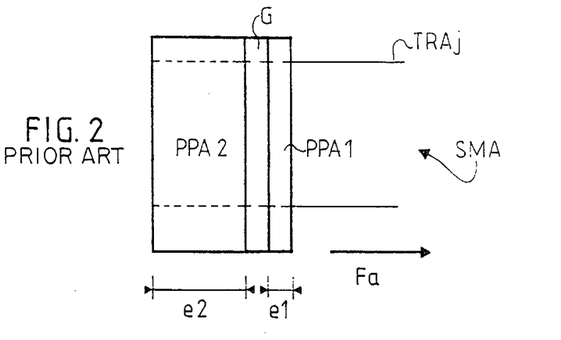
FIG. 2 is a view from below the magnetic writing transducer of the device taken from the recording medium.
Figure 3:
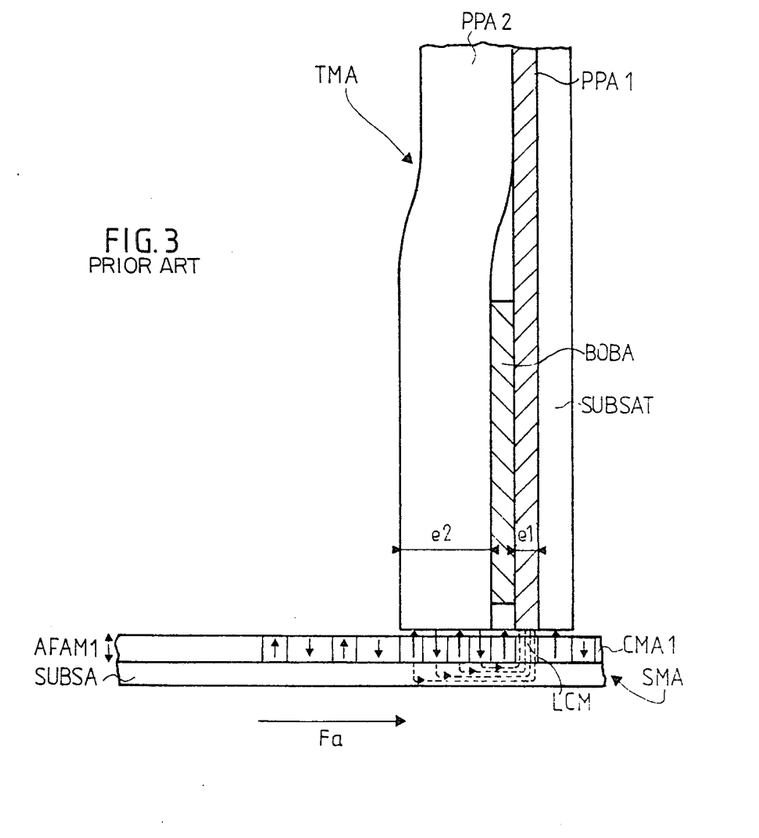
FIG. 3 is a cutaway side view taken in a plane normal to the magnetic recording medium and parallel to its direction of movement.

For a better understanding of the principles of composition and operation of the device for writing data with high density on a base material, according to the invention, it is useful to remember some of the principles of composition and operation of the prior art device for writing data with high density. These principles are depicted in FIGS. 1, 2 and 3 which show a writing device DEA as known from the prior art for writing on a recording medium SMA.

This device DEA comprises, on the one hand, a magnetic, preferably integrated, transducer TMA and the magnetic recording layer CMA1. As can be seen in particular from FIGS. 1 and 3, the magnetic recording medium CMA1 is deposited on a substrate SUBSA pertaining to the base meterial SMA.

The layer CMA1 is made of a magnetic anisotropic material whose axis of easy magnetization is AFAM1. It is oriented at right angles to the surface of the layer in the direction of the axis Oy (FIG. 1). Preferably, the transducer TMA is of the integrated type and is, for example, similar to that which forms part of the writing device of known, construction as described in the aforementioned U.S. Pat. No. 4,287,544.

The transducer TMA comprises a first pole tip PPA1, a second pole tip PPA2, and a winding BOBA.

Both pole tips PPA1 and PPA2 are arranged on the same side of the data medium SMA and have in the vicinity thereof the gap G whose length is normal to the direction of motion Fa of the data Fa. The pole tips are made up of a plurality of thin magnetic layers separated from one another by thin film insulating layers. The pole tip PPA1 is placed on a non-magnetic and insulating substrate SUBSAT (only shown in FIG. 3 and not shown in FIG. 1 to provide an uncluttered view of the latter).

The winding BOBA is formed by a succession of thin film conducting and insulating, superposed layers enclosed by the two pole tips PPA1 and PPA2. Preferably, the pole tip PPA1 has a thickness e1 (measured in a direction parallel to the direction of motion Fa) much smaller than the thickness e2 of the pole tip PPA2.

More often than not the pole tips PPA1 and PPA2 are made of a magnetic anisotropic material. The axis of easy magnetization of the pole tips is the axis AFAT which is parallel to the direction Ox (that is to say, normal to the direction of motion Fa and parallel to the plane of the base material SMA). The axis of difficult matgnetization is the axis ADAP which is normal to the plane of the magnetic recording plane SMA.

To write the data on a track TRAj of the basic material SMA, which moves in the direction of the arrow Fa at a given speed, a current is passed through the winding BOBA, representing the data to be written and made up of a string of positive and negative pulses with variable duration. This current causes the generation of a magnetic flux in the pole tips PPA1 and PPA2 which closes through the magnetic layer CMA1 and the substrate SUBSA in the manner indicated in FIG. 3 by the magnetic field lines LCM. Opposite the pole tip PPA2 the magnetic field has an intensity much weaker than opposite the pole tip PPA1 because, on the one hand, the thickness e2 is greater than the thickness e1 and, on the other hand, the magnetic flux flowing in the assembly, formed by the two pole tips PPA1 and PPA2 is a closed loop being concentrated at pole tip PPA1. The magnetic layer CMA1 and the substrate SUBSA can be considered conservative. Thus, the magnetic layer CMA1 facing the pole tip PPA2 cannot be saturated.

Thus, as mentioned above, in a writing device DEA as known from the prior art, only the downstream pole tip PPA1 writes the data on the magnetic recording medium SMA.

The magnetic domains written by the pole tip PPA1 are, for example, shown in FIGS. 1 and 3. As can readily be seen, in these domains (which are usually of variable length) the magnetic induction is directed at right angles to the surface of the base material SMA and the magnetizations in adjoining domains, such as the domains Di and Di+1, on the one hand, Di+1 and Di+2 on the other, are of opposite polarity as indicated by the direction of the arrows.

The device DEI of the invention for high-density writing, whose skeleton diagram is depicted in FIGS. 4 and 5, enables data to be written on a magnetic recording medium with radial and per unit length densities which are substantially higher than those obtained by the devices of known construction, such as DEA.

This is obtained by utilizing a magnetic transducer TMI, whose winding is BOBI, having two adjoining writing poles PEI1 and PEI2, e.g., with identical dimensions and of opposite polarity. They act simultaneously on the magnetic recording medium CMI1, which is identical to CMA1 of FIG. 1, by supplying magnetic writing fields which are normal to the surface, are of opposite polarity, and follow a direction parallel to the surface of the layer and normal to the direction of motion of the base material, i.e., radially if the latter is a magnetic disc.

It is obvious that the two writing poles PEI1, PEI2 form the magnetic circuit of the transducer TWI which contains the gap GI.

In FIGS. 4 and 5, the transducer TMI and the recording medium SMI are marked with respect to a system of rectangular axes Ox Oy Oz. It is assumed that SMI is a magnetic disc which moves in the direction of the arrow Fi, parallel to axis Ox. Thus, Oz is the axis which is parallel to the surface of the layer and normal to the direction of motion, and Oy is the axis normal to the surface of the layer.

As can be seen from FIGS. 4 and 5, the two adjoining writing poles PEI1 and PEI2 have thicknesses of, respectively, e3 and e4 (measured in the direction Oz) which are approximately equal, say, of the order of one to several microns. The recording medium SMI is completely identical to the recording medium SMA shown in FIGS. 1 and 3, that is to say, it comprises the magnetic ani.sotropic recording layer CMI1 and a substrate SUBSI.

The axis of easy magnetization AFAMI1 of the recording layer CMI1 is normal to the surface of the layer, i.e., parallel to Oy.

Figure 6:
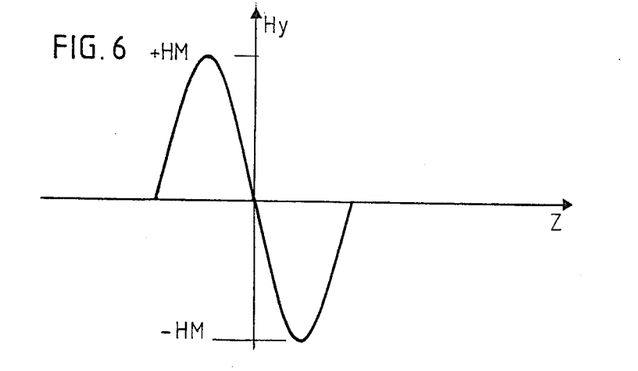
FIG. 6 shows the distribution of the magnetic field created by the two writing poles of the magnetic transducer of the device of the invention, said magnetic field being normal to the surface of the base material and said distribution being considered in a section perpendicular to the direction of motion of the data.

By considering the distribution of the magnetic field Hy (which is normal to the surface of the base material) in a direction parallel to Oz, that is to say, radially as the distribution obtained in the immediate vicinity of the two writing poles PEI1 and PEI2 (i.e., likewise in the immediate vicinity of the surface of the layer CMI1), the curve depicted in FIG. 6 is obtained. As can be seen, the writing pole PEI1 supplies a positive magnetic field with a maximum amplitude HM (obtained substantially in the middle of the pole tip PEI1), while the writing pole PEI supplies a negative magnetic field Hy with a maximum value −HM. The absolute value of the fields HM and −HM is approximately the same.

The operation of the device for writing data with high density on a magnetic medium DEI according to the invention is as follows:

A current representing the data to be written is passed through the winding BOBI. This current consists of a train of positive and negative pulses with variable duration. It is assumed, for example, that at a given moment a positive current pulse is passed through the winding BOBI. This current pulse causes the generation of a magnetic flow in the writing poles PEI1 and PEI2 which flows through the magnetic layer CMI1 of the recording medium SMI. By the mere fact that the axis of easy magnetization of the layer CMI1, i.e., AFAMI1, is normal to the surface of the recording medium SMI, the magnetic field near the two writing poles PEI1 and PEI2, to the right thereof, is canalized, i.e., concentrated in the direction of the axis of easy magnetization AFAMI1 and it has practically the same concentration near each of the writing poles PEI1 and PE12, because the thickness e3 and e4 are approximately the same. The stray field Hy facing the two writing poles PEI1 and PEI2 is thus substantially normal to the plane of the layer CMI1 and saturates the latter in the direction of its axis of easy magnetization AFAMI1. The positive field Hy, generated by the writing pole PEI1 saturates the magnetic layer CMI1 positively, while the field Hy generated by the writing pole PEI2, which is negative, saturates the layer CMI1 negatively. The flux lines are indicated by the magnetic field lines LCMi (FIGS. 4 and 5), the magnetic flux lines closing, say, in the substrate SUBSI.

When the recording medium SMI moves in the direction of the arrow Fi past the transducer TMI, a track TRIj of data is recorded. This track comprises a plurality of "large magnetic domains" GDMi−1, GDMi, GDMi +1, etc...., (see FIGS. 10 and 11) similar to the "large magnetic domains" GDMi shown in FIG. 7 (except in length). Each of them comprises two magnetic domains of magnetization opposed to one another (one has a positive magnetization, the other a negative magnetization) which adjoin in a radial direction. Thus, the large domain GDMi is made up of two domain DMi1 and DMi2 of respective magnetizations, one positive and one negative. Likewise, the large domain GDMi+1 comprises two domains DMi+1.1, DMi+1.2 of opposite magnetizations. The domain DMi+1.1 has a negative magnetization and the domain DMi+1.2 a positive magnetization. A line of argument similar to that which has just been given for the domain GDMi+1 could be made for the domain GDMi−1.

Figure 7:
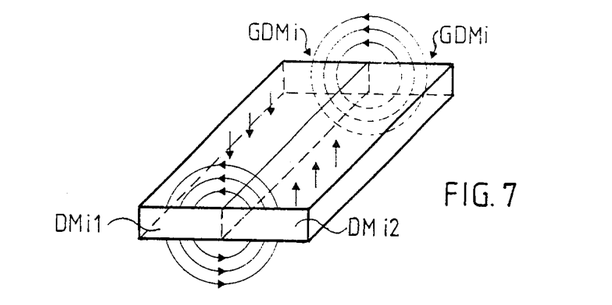
FIG. 7 shows a large magnetic domain recorded by the device of the invention on the magnetic medium, said large domain being composed of two adjoining domains viewed in a direction perpendicular to the direction of motion of the base material where the magnetization are of opposite direction.
Figure 10:
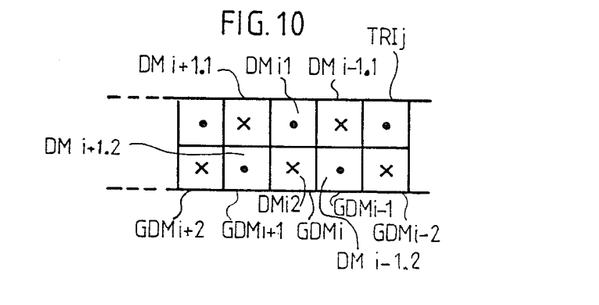
FIG. 10 is a top view of a track portion recorded by the device for high-density writing according to the invention, showing a group of successive large magnetic domains of a recording track of the base material.
Figure 11:
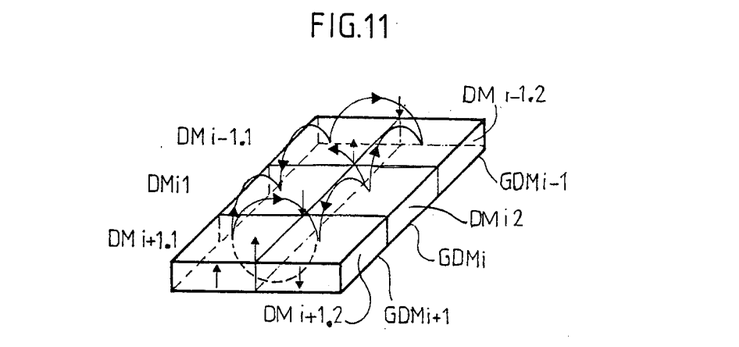
FIG. 11 shows the advantages of a group of successive large domains of a track written by the device of the invention.

FIG. 10 shows five large adjoining domains of the track TRIj, namely, the domains GDMi+2, GDMi+1, GDMi, GDMi−1, GDMi−2, said domains being viewed from above. The sign of the magnetizations of each of the two domains forming these large domains is shown, the negative magnetizations being symbolized by a point and the positive magnetizations by a cross. Thus, in the domains located in the upper part of the figure and forming part of the "large domains" GDMi+2 to GDMi−2, the magnetizations are successively negative, positive, negative, positive and negative Conversely, in the domains located in the lower portion of FIG. 10 and pertaining to the same "large domains" as previously, the magnetizations are successively positive, negative, positive, negative and positive. The obvious advantage of the writing device of the invention can be seen immediately, namely, the fact that the large magnetic domains obtained on each track TRIj of the base material SMI are magnetically self-stabilizing. Thus, if the large domain GDMi of FIG. 7 is considered, it can be seen that at the top the flux lines go from the magnetic domain DMI2 to the domain DMi1, while reclosing within the latter, and that at the bottom the magnetic field lines go from the magnetic domain DMi1 to the magnetic domain DMi2 by reclosing within the latter.

Thus, it can be seen that the data written of the base material SMI by means of the device of the invention for writing with high density will remain perfectly stable over time.

Moreover, as mentioned hereinabove, it will be possible to read the two domains (DMi1, DMi2) of the large domain (GDMi) simultaneously by means of a magneto-optical device of the type described in the above-mentioned French patent, application No. 82.08406, and its corresponding U.S. Pat. No. 4,531,205, which will enable the signal/noise ratio of the device for reading data on the base material to be improved and to decrease the reading error rate.

Finally, it is shown that the gradient of the magnetic field Hy in the direction Oz near the center of the gap GI, namely, $\partial Hy/\partial z$ plays a role in the accuracy with which are defined the adjoining domains such as DMI1, DMI2. In particular, the higher $\partial Hy/\partial z$, the weaker the noise level during the reading of the two domains.

Figure 8:
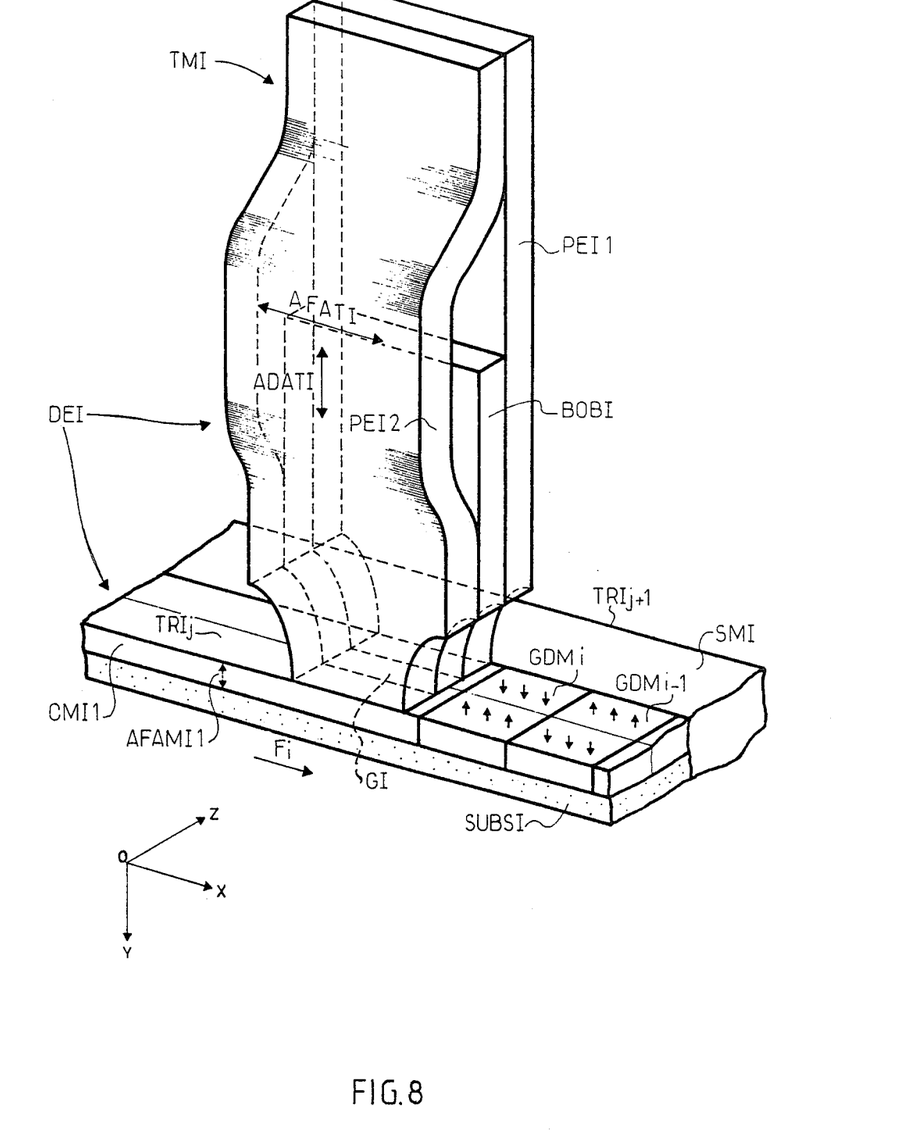
FIG. 8 is a fragmentary perspective of a preferred embodiment of the device for high-density writing according to the invention.
Figure 9:
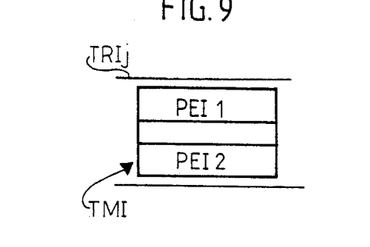
FIG. 9 shows the device of FIG. 8 viewed from below the magnetic recording medium.

FIGS. 8 and 9 show a preferred embodiment of the reading device of the invention where the transducer TM1 is a transducer of the integrated type. The writing poles IEI1 and PEI2 are made up of thin film layers, that is to say, they are formed by a succession of thin film magnetic and nonmagnetic layers, the winding BOBI being constructed in the form of a piling up of the thin film conducting and insulating layers. Preferably, the writing poles PEI1 and PEI2 are made from magnetic anisotropic material, the axis of easy magnetization AFATI being parallel to the base material SMI in the direction of motion Fi of the data medium, while the axis of difficult magnetization ADATI is normal to the base material SMI. The use of an anisotropic material having its axes of easy and difficult magnetization oriented as indicated hereinabove enables one to obtain good directivity of the field Hy in the direction Oy and thus cooperates in obtaining higher radial and per unit line densities.

As can be seen in FIG. 8, the two writing poles have a narrowing near the gap GI, i.e., the corners are cut away, which improves the ratio between the electrical energy supplied by the winding BOBI and the magnetic energy supplied by the transducer to the recording medium SMI. Likewise, it can be seen that the transducer TMI is arranged in relation to the recording medium SMI in such a way that the large dimension (also called length) of the gap is parallel to the direction of motion of the data.

It is obvious that the invention is applicable to other modified forms of the device for writing data on a magnetic medium among which are:

(1) those for which one acts on the dimensions and profiles of the two writing pole tips, the thickness e3 being, say, less than the thickness e4; and (2) those comprising a plurality of, preferably identical, transducers similar to the transducer TMI of FIG. 8 arranged one beside the other in the direction Oz. Thus, a multi-transducer device is obtained which is capable of writing simultaneously a plurality of neighboring tracks such as the track TRIj shown in FIGS. 8 and 10.

It goes without saying that the various modified forms of the invention described hereinabove can be combined without departing from the scope and spirit of the invention.

We claim:

1. Apparatus for perpendicularly writing data on a magnetic carrier having a recording layer of a magnetic anisotropic material, the material having an axis of easy magnetization perpendicular to a surface of the recording layer, comprising a magnetic transducer, the carrier and recording layer being adapted to move past the magnetic transducer for writing data onto the recording layer, said transducer comprising two substantially planar thin film poles having first ends which are magnetically coupled together and having second ends which are spaced apart to form between adjacent edges of the second ends a rectangularly-shaped gap having a length parallel to the adjacent edges and a width perpendicular to said length, the length of the gap being greater than the width of the gap, the poles being oriented perpendicular to the surface of the recording layer with the second ends and said gap disposed adjacent to said surface in a plane parallel to the surface, and a winding between said poles for establishing a magnetic circuit, said magnetic circuit comprising said two poles and a portion of the magnetic carrier adjacent to the gap, said poles being of opposite polarity for respectively supplying simultaneously to said surface magnetic writing fields which are normal to said surface and of opposite polarity, and wherein said poles are oriented with respect to the recording layer such that the length of said gap extends parallel to the direction of movement of the recording layer.

2. Apparatus according to claim 1, wherein the second ends of the poles are of a magnetic anisotropic material having an axis of easy magnetization parallel to the direction of movement of the carrier.

3. Apparatus according to claim 1, wherein the poles have substantially equal thicknesses measured in another direction perpendicular to said direction of movement.

4. Apparatus according to claim 1, wherein said poles are sized to afford a track density in a direction perpendicular to said direction of movement of the order of 5,000 tracks per cm, and to afford a per unit length density in a direction parallel to said direction of movement so as to permit 10,000 changes in magnetization direction per cm.

5. Apparatus according to claim 1 further comprising means for energizing said transducer so as to form in the recording layer a succession of large magnetic domains of alternating opposite nature in the direction of movement of the recording layer, each large domain comprising in a direction normal to said direction of movement two adjoining domains of opposite magnetization.

6. Apparatus according to claim 1, wherein said second ends have a generally rectangular configuration in said plane parallel to the surface of the recording layer, and the poles are oriented such that they have a pole length in said plane which is parallel to said direction of movement.

7. Apparatus according to claim 6, wherein said magnetic carrier comprises a circular magnetic disk, and wherein the poles are oriented such that the pole length is perpendicular to a radius of the disk.

8. Apparatus according to claim 7, wherein the poles have substantially equal thicknesses measured in another direction perpendicular to the direction of movement.

9. Apparatus according to claim 6, wherein the poles have substantially equal thicknesses measured in another direction perpendicular to the direction of movement.

10. Apparatus according to claim 6, wherein the second ends of said poles have substantially equal widths of the order of one to several microns.

11. Magnetic transducer apparatus for recording data perpendicularly on a magnetic carrier which is adapted to move past the apparatus in a predetermined direction, the magnetic carrier having a magnetic recording layer formed of an anisotropic magnetic material having an axis of easy magnetization perpendicular to a surface of the recording layer, the apparatus comprising a magnetic transducer, the magnetic transducer comprising two recording poles of opposite polarity, the poles being thin substantially planar members disposed in respective spaced parallel planes, the members being magnetically coupled together at one extremity thereof and being spaced apart at another extremity to form between the poles a rectangularly-shaped gap having a large dimension in a direction parallel to the respective planes and having a small dimension perpendicular to the respective planes, the poles being situated such that the other extremity of the poles and the gap are positioned adjacent to the recording layer with the respective planes of the poles being perpendicular to the surface of the recording layer, and the poles being oriented such that the respective planes and the large dimension of the gap are parallel to the predetermined direction of movement of the carrier, and an electrical coil associated with the poles so as to establish a magnetic circuit for recording data by the two poles on the recording layer by magnetic recording fields which are perpendicular to said surface and of opposite polarity.

12. Magnetic transducer apparatus according to claim 11, wherein the magnetic carrier is a rotating magnetic disk, and the poles are oriented such that their respective planes are perpendicular to a radius of the disk.

* * * * *

UNITED STATES PATENT AND TRADEMARK OFFICE
CERTIFICATE OF CORRECTION

PATENT NO.   : 4,763,215

DATED        : August 9, 1988

INVENTOR(S)  : Gueugnon et al

It is certified that error appears in the above-identified patent and that said Letters Patent is hereby corrected as shown below:

Column 10, line 6, (Claim 6, line 4) "they" should be
--the second ends--.

Signed and Sealed this

Eighteenth Day of July, 1989

Attest:

DONALD J. QUIGG

Attesting Officer

Commissioner of Patents and Trademarks